(12) United States Patent
Reist

(10) Patent No.: US 7,870,948 B2
(45) Date of Patent: Jan. 18, 2011

(54) ROLLING CONVEYING DEVICE

(75) Inventor: Walter Reist, Hinwil (CH)

(73) Assignee: WRH Walter Reist Holding AG, Ermatingen (CH)

( * ) Notice: Subject to any disclaimer, the term of this patent is extended or adjusted under 35 U.S.C. 154(b) by 751 days.

(21) Appl. No.: 10/598,937

(22) PCT Filed: Mar. 11, 2005

(86) PCT No.: PCT/CH2005/000144

§ 371 (c)(1),
(2), (4) Date: Oct. 4, 2006

(87) PCT Pub. No.: WO2005/087627

PCT Pub. Date: Sep. 22, 2005

(65) Prior Publication Data
US 2008/0245640 A1 Oct. 9, 2008

(30) Foreign Application Priority Data
Mar. 18, 2004 (CH) .................................. 456/04

(51) Int. Cl.
B65G 21/00 (2006.01)
B65G 21/18 (2006.01)
B65G 17/00 (2006.01)
(52) U.S. Cl. ................. 198/779; 198/803.1; 198/465.1; 198/803.2; 198/860.3
(58) Field of Classification Search .................. 198/183, 198/181
See application file for complete search history.

(56) References Cited

U.S. PATENT DOCUMENTS

| 3,595,377 | A | * | 7/1971 | McCoy et al. ................ 198/840 |
| 3,690,433 | A | * | 9/1972 | Buldini .................... 198/345.3 |
| 4,712,670 | A | * | 12/1987 | Burkhardt .............. 198/867.13 |
| 6,269,942 | B1 | | 8/2001 | Mader et al. |
| 6,554,126 | B1 | | 4/2003 | Muller |

FOREIGN PATENT DOCUMENTS

| DE | 1273415 | * | 2/1966 |
| DE | 12 73 415 | | 7/1968 |
| EP | 0 139 287 | | 5/1985 |
| EP | 0 338 500 | | 10/1989 |
| EP | 338500 A | * | 10/1989 |
| EP | 0338500 A2 | * | 10/1989 |

* cited by examiner

Primary Examiner—Gene Crawford
Assistant Examiner—Yolanda Cumbess
(74) Attorney, Agent, or Firm—Renkin, Hill & Clark LLP

(57) ABSTRACT

A rolling conveying device including guide rails 6, 6', 5' in which, respectively, at least one rolling body 1, 1', 8 with a plurality of freely rotatable rollers 2 is arranged in operational interaction with a plurality of conveying bodies 10 which are freely displaceable between the rollers of the rolling body. The rolling body or bodies form tracks closed in themselves, they are not, however, chains because they are neither pulled nor pushed. Solely the conveying bodies are displaced, respectively, driven between the rolling bodies.

24 Claims, 13 Drawing Sheets

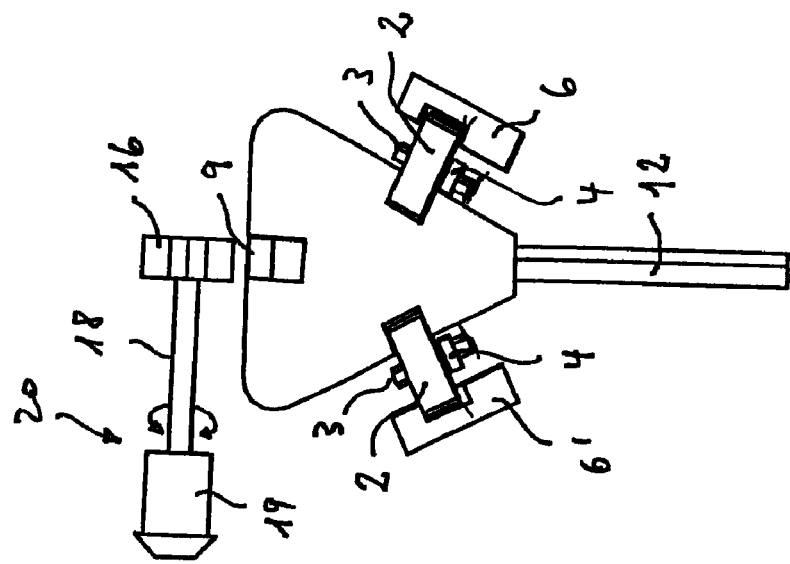
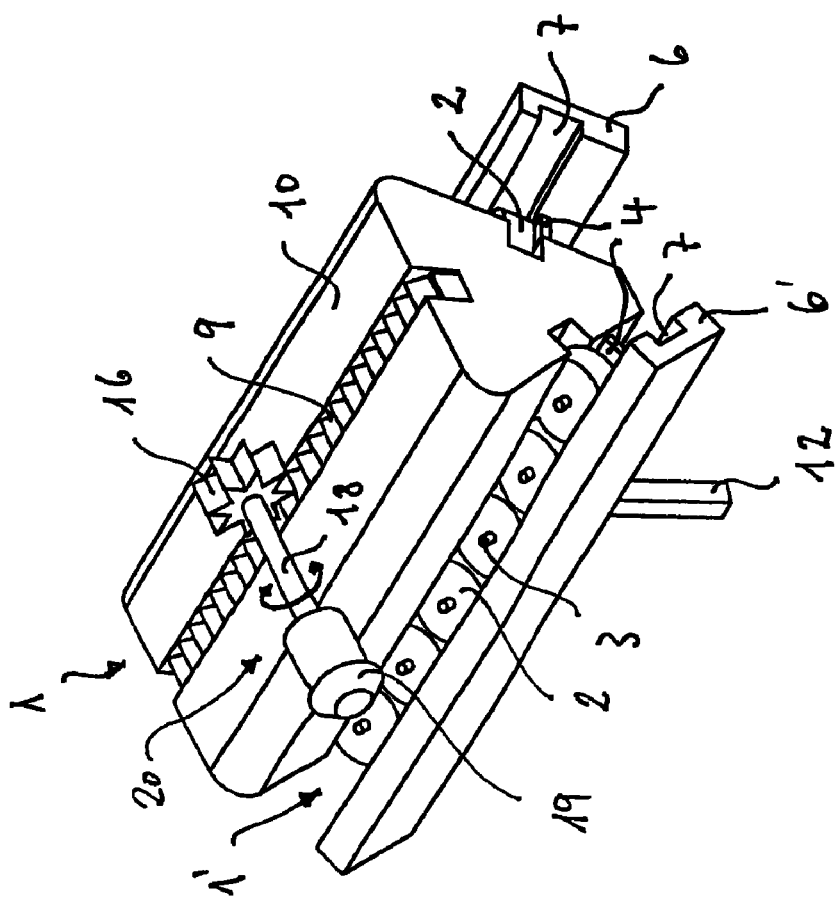
Fig. 3A
Fig. 3B

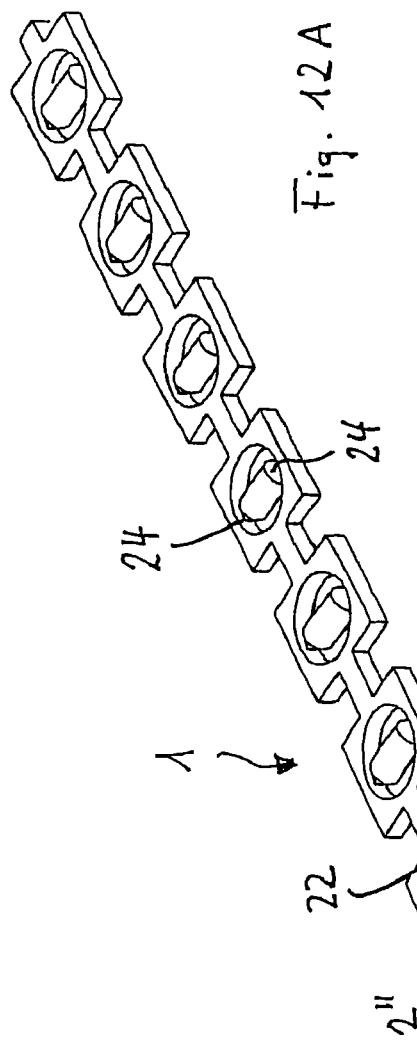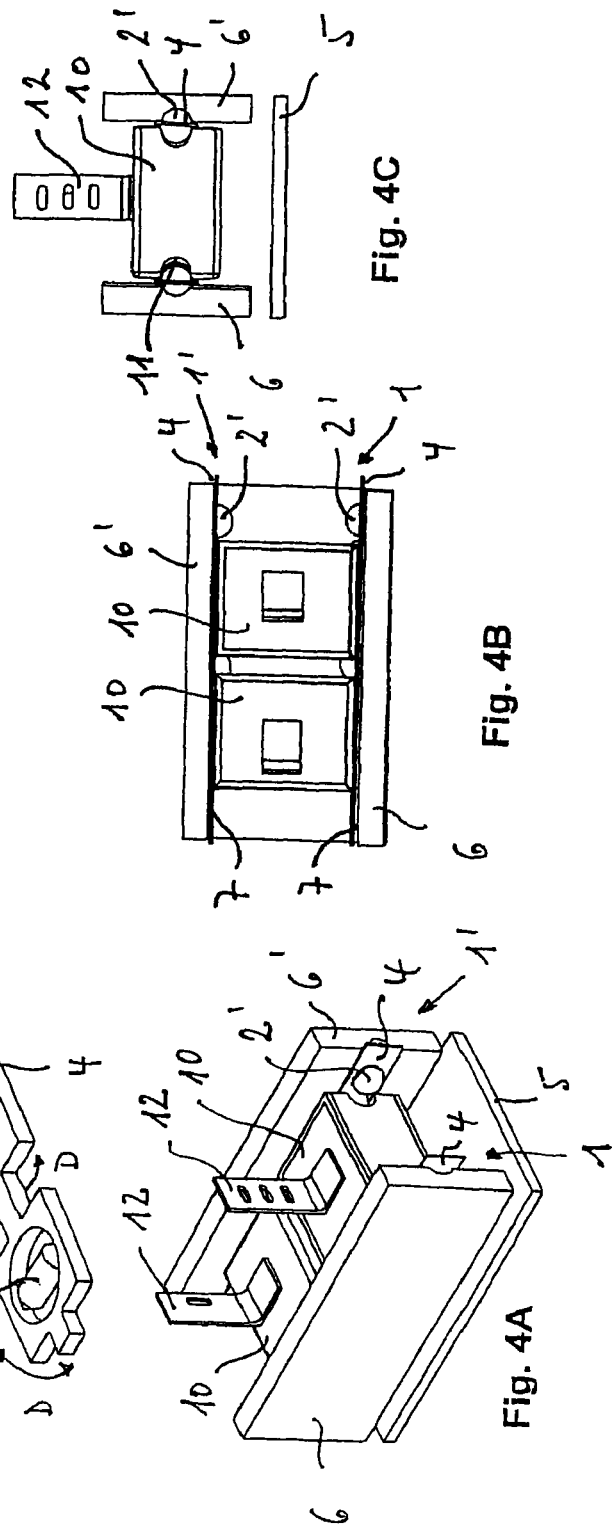

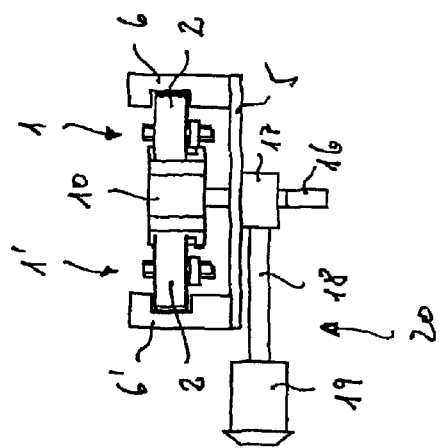
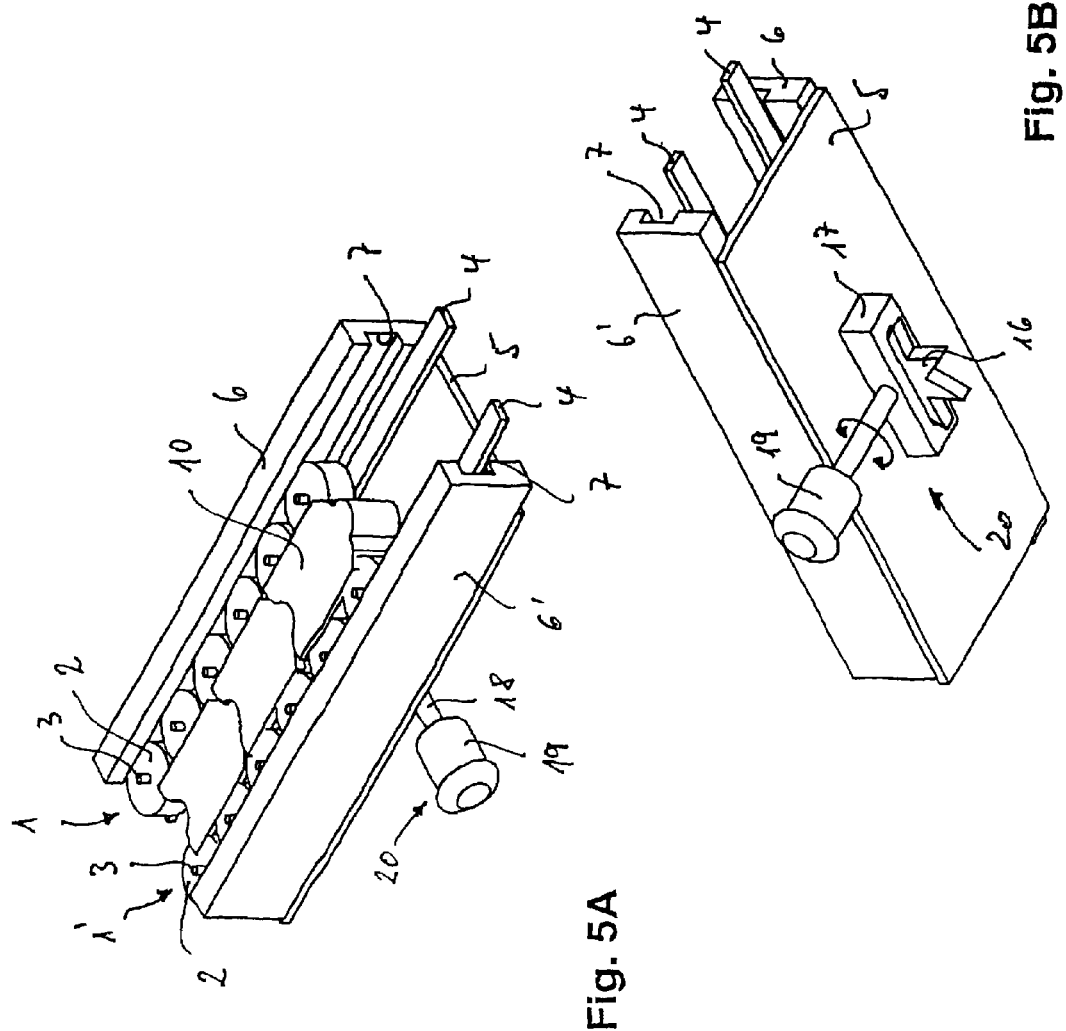
Fig. 5C
Fig. 5B
Fig. 5A

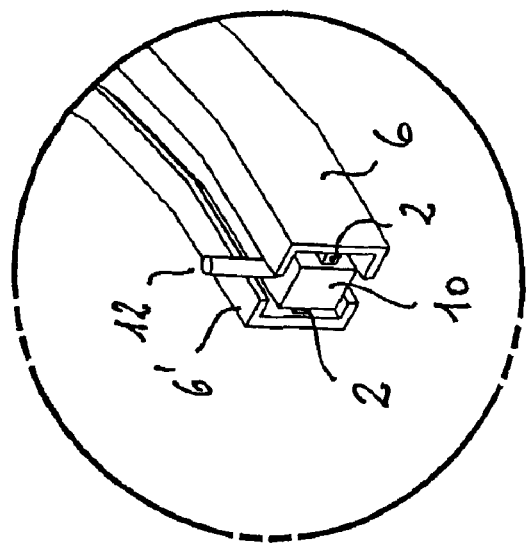
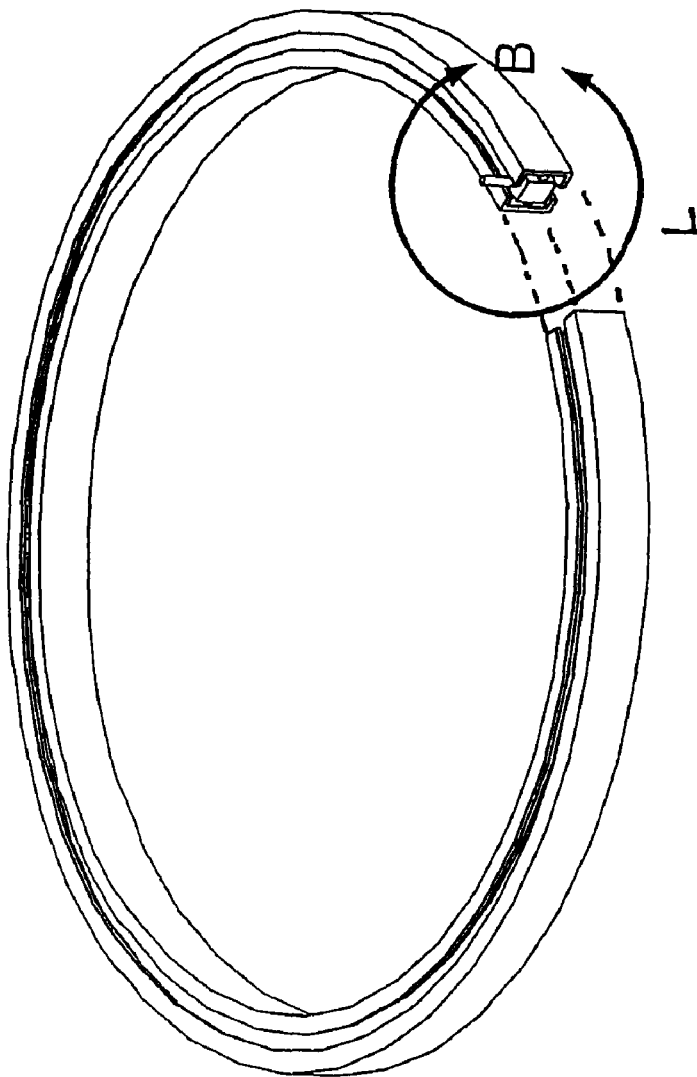
Fig. 9B
Fig. 9A

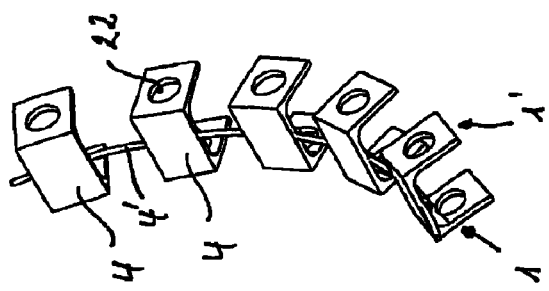
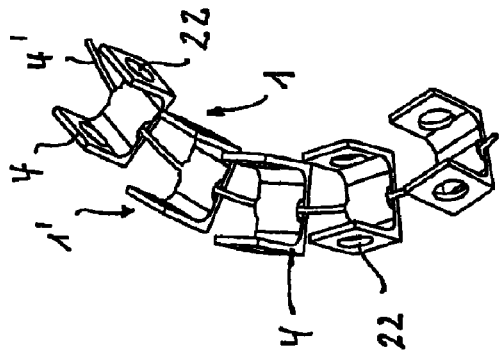
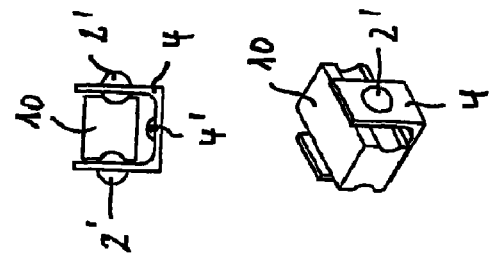
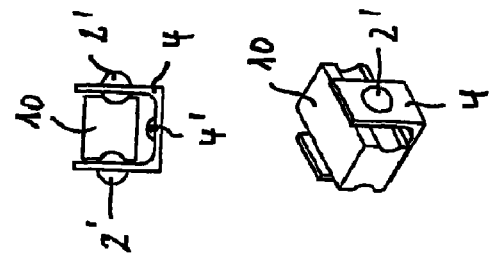
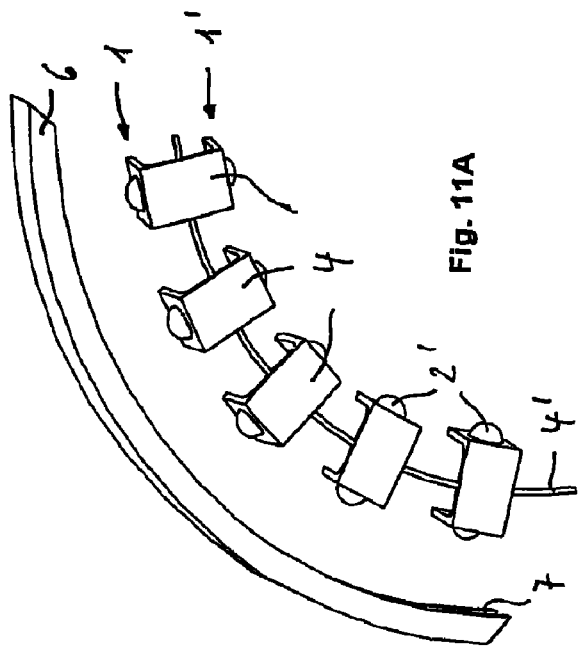
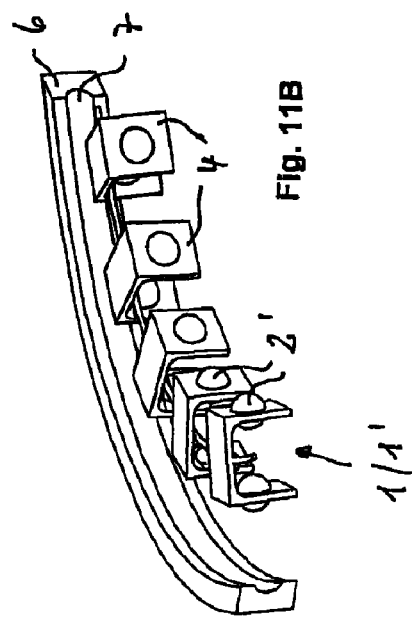

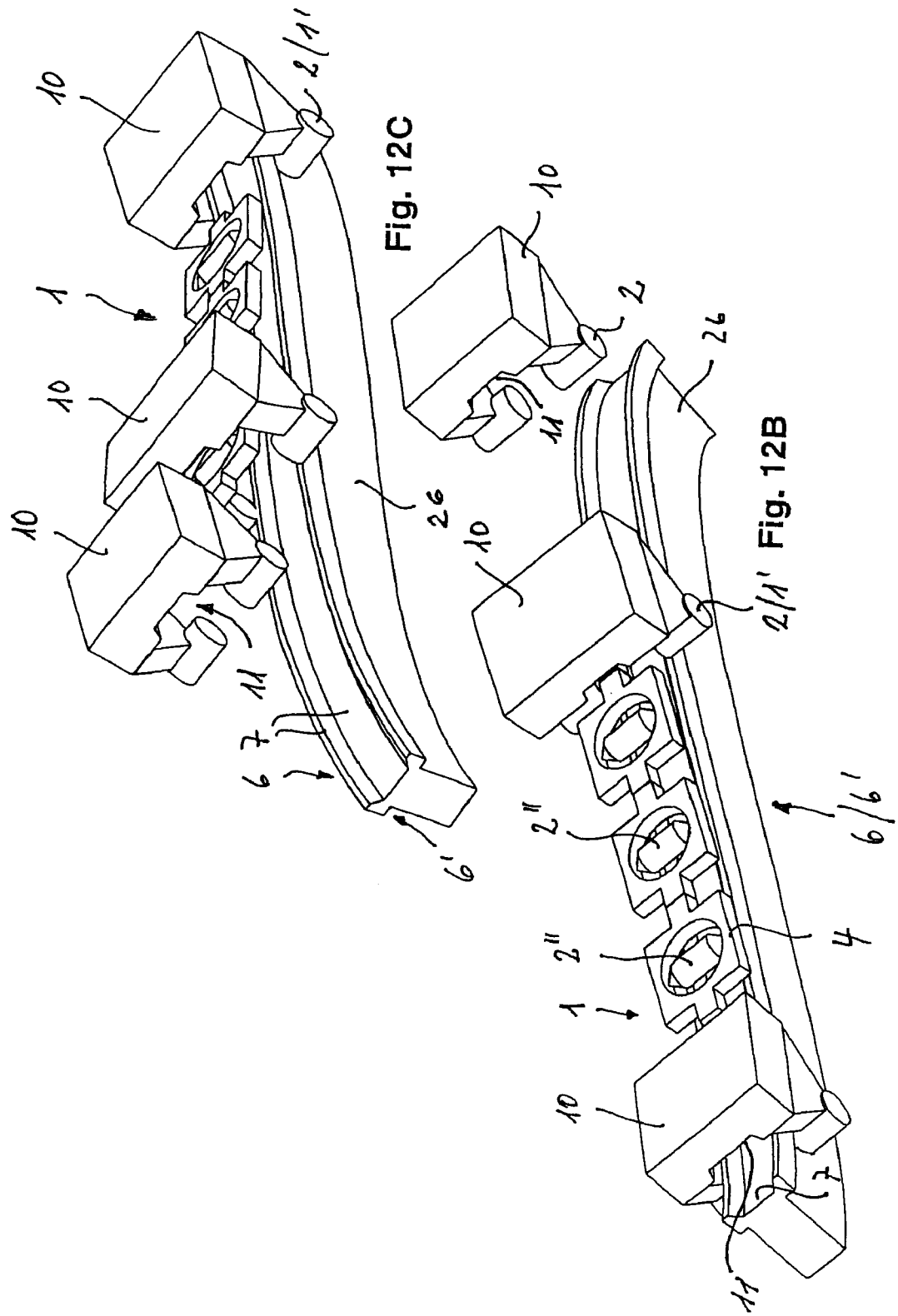

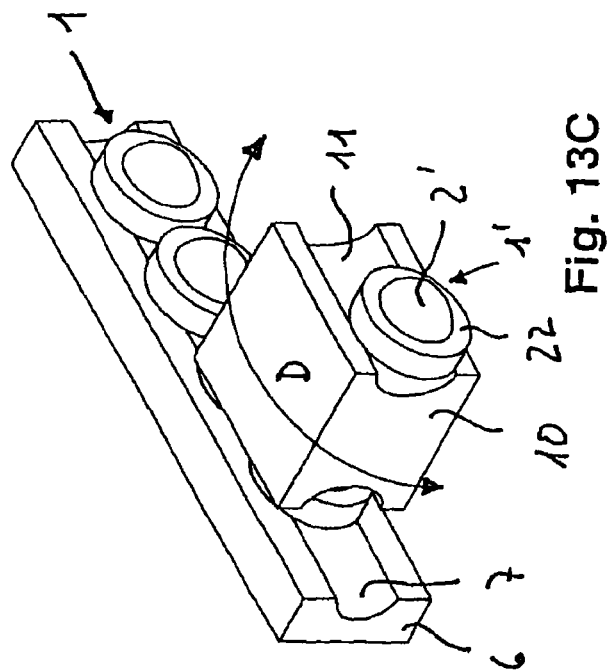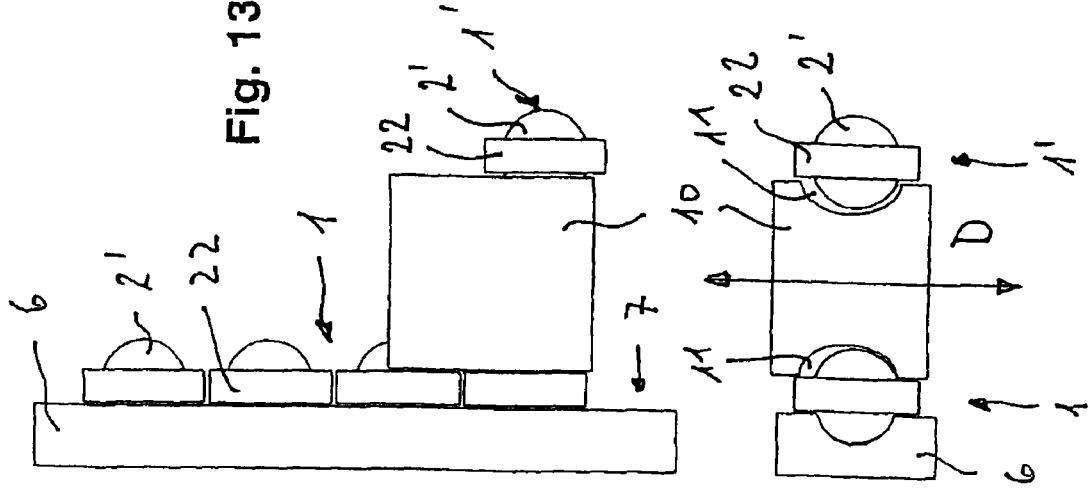

ROLLING CONVEYING DEVICE

BACKGROUND OF THE INVENTION

The invention is related to the field of materials handling technology and concerns a conveying device for the conveying of materials, objects and so on, wherein the device is capable of being equipped with any means for taking on materials or objects. The invention is distinguished by the fact, that with few, inexpensive means any conveying paths or conveying tracks are capable of being created, on which it is possible for a flowing conveyance to take place.

BRIEF SUMMARY OF THE INVENTION

The invention essentially consists of few components, namely: one or two guide rails, in which a rolling body or a combination of rollers with a plurality of freely rotating rollers, balls, cylinders, etc. is arranged and with a plurality of conveying bodies capable of being displaced on or between the rollers of the rolling body. The rolling bodies form, for example, circuits closed in themselves, however, they are not chains, because unlike chains they are not pulled or pushed.

FIGS. 1A and 1B, in an exploded view, illustrate a piece, resp, part of a track, of an exemplary conveying device in accordance with the invention. In this example, one of the guide rails 6 comprises an engagement groove or guide groove 7, in which the rollers 2 of the rolling body 1 are able to rotate freely. The rolling body, as a combination of rollers, consists of a connecting piece 4, on which a plurality of rollers 2 are arranged freely rotatable on axes 3. The same arrangement of guide rail 6' and rolling body 1' with rollers 2 is present again in mirror image as a counterpart. In between one is able to see two (out of a plurality) of conveying bodies 10, which on both sides longitudinally comprise an engagement groove or guide groove 11 for the free and undriven running of the rollers 2, in order to get into an operational connection with the roller bodies 1 and 1' and the rails 6 and 6', the latter of which in this depicted embodiment extends from rail 6 to rail 6' and enables a rolling displacement of the conveying bodies 10. The rollers 2 engage in the corresponding guide groove 7 and 11 by up to between $\frac{1}{5}$ to $\frac{1}{3}$ of the diameters of the rollers utilised. The conveying body 10, schematically illustrated, comprises a receptacle 12 for the attachment of, for example, a clamp for materials to be transported. Not illustrated are: one drive, resp., several drives, with which the conveying bodies 10 are moved, resp., driven. A connecting plate 5, by means of which the two guide rails 6 and 6' are held together and at the same distance from one another, is indicated below them. As stated, all Figures only illustrate a part of a conveying track of any length and with any routing. Variants of the conveying track are discussed following the captions of the Figures.

The rolling body 1, resp. 1' and in a further embodiment of the device the rolling body 8 (refer to FIGS. A and B) is capable of being designed in the following manner. The connecting piece 4 is manufactured out of an elastic material, in which the axes 3 for the rollers 2 are fixed. The axes 3 comprise a seat (not depicted here), which prevents the rollers 2 from coming into contact with the connecting piece 4, in other words, which enables the rollers 2 to be freely rotatable. The rollers 2 are put onto the axes 3 and at the upper end of the axes 3 are fixed so as to be adequately prevented from becoming detached from the axes. In this embodiment, it is possible for the roller bodies to adapt themselves to any track shape of the guide rails 6, 6'. Capable of being utilised as materials for the connecting piece 4, for example, are plastic bands (ribbons), for the rollers 2 a rigid plastic material and for the axes 3 metal pins are usable materials.

The conveying bodies 10 are able to be manufactured out of the same material as the rollers 2. These conveying bodies are jointly driven, wherein one pushes the other one. For a drive of this kind, it is possible to provide engagement from below through the connecting plate 5 or laterally on the receptacle 12, for example, by means of several conveyor drives arranged at a distance from one another.

An essential point is that the engagement of the rollers 2 in the guide grooves 11 may comprise relatively large play, without the operability being impaired by this. This provides the possibility during manufacturing of producing components for the device in large numbers without the necessity of a great precision, which in turn has a very beneficial effect on the cost side. And despite this, for a mechanical construction, having a relatively loose assembly, the conveying bodies run in a silkily soft and almost flowing manner, so that it is possible to refer to a kind of flowing materials handling technology.

In the following, the object of the invention discussed above is described in more detail on the basis of preferred examples of embodiments, which are illustrated in the attached drawings. These depict:

BRIEF DESCRIPTION OF THE DRAWINGS

FIGS. 3A 3B and 3C are a perspective, end and perspective views, respectively of a part of a further embodiment of the invention with a stylised drive for moving the conveying bodies, FIGS. 4A 4B and 4C are a perspective, top and end view respectively of an embodiment of the invention with a combination of rollers of balls instead of rollers, FIGS. 5A 5B and 5C are two perspective views and an end view of an embodiment with a stylised drive for the conveying bodies.

FIGS. 9A and 9B are a perspective view and a detailed view of the conveying device according to the invention as a closed track, FIGS. 10A and 10B are perspective views of an embodiment of the rolling body, which is especially suitable for tight curve radii, FIGS. 11A and 11B shows the embodiment of FIG. 10 with the rolling body depicted with inserted roller bodies and one of the two guide rails, FIGS. 11C and 11D show one element of the rolling body with inserted balls and a guide body illustrated in a frontal view and in a perspective view, FIGS. 12A and 12B and 12C are perspective views of a further embodiment of the three elements, a guide body, which comprises both guide rails, therefore guide rail, rolling body and conveying body, in the case of which one guide rail is also capable of taking over the function of the second guide rail, FIGS. 13A and 13B and 13C show a side, front and perspective view of an embodiment of the imitation of the embodiment in accordance with FIG. 4, in the case of which the rolling bodies are also capable of consisting of roller bodies without any mutual connection.

DETAILED DESCRIPTION OF THE INVENTION

Figure 1B:
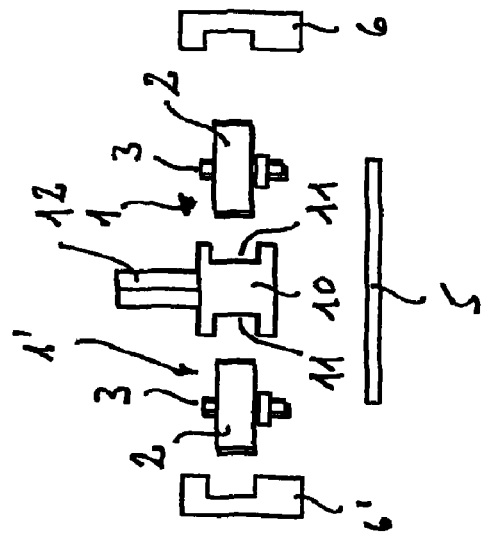
FIGS. 1A and 1B are a perspective view and end view of the embodiment of the rolling conveying device invention described above.

The reference marks utilised in the drawings and their significance are listed in summary in the list of reference marks. In general, in the Figures, identical components or analogous components acting in the same manner are provided with the same reference marks.

In this context, the following is to be remarked: the illustrations are in the form of rough sketches and not finished constructions and all physical depictions are parts of a whole. It is possible that the whole, respectively, is a track closed in itself, in which the rolling bodies, the rows of conveying bodies and the guide rails respectively lead back to themselves.

Figure 1A:
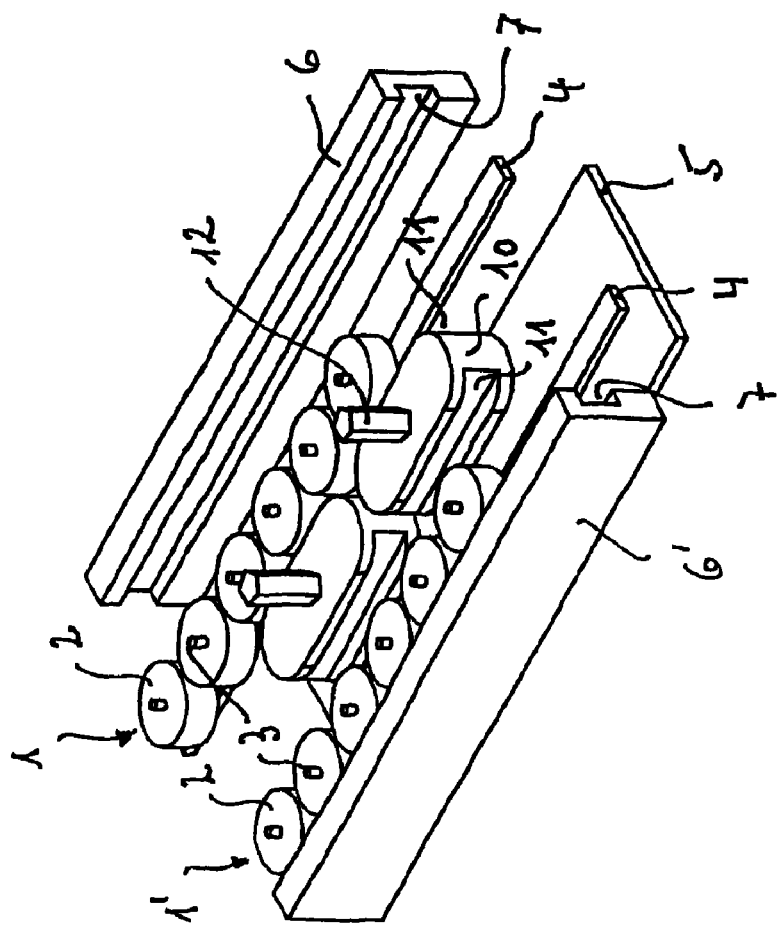
Figure 2A:
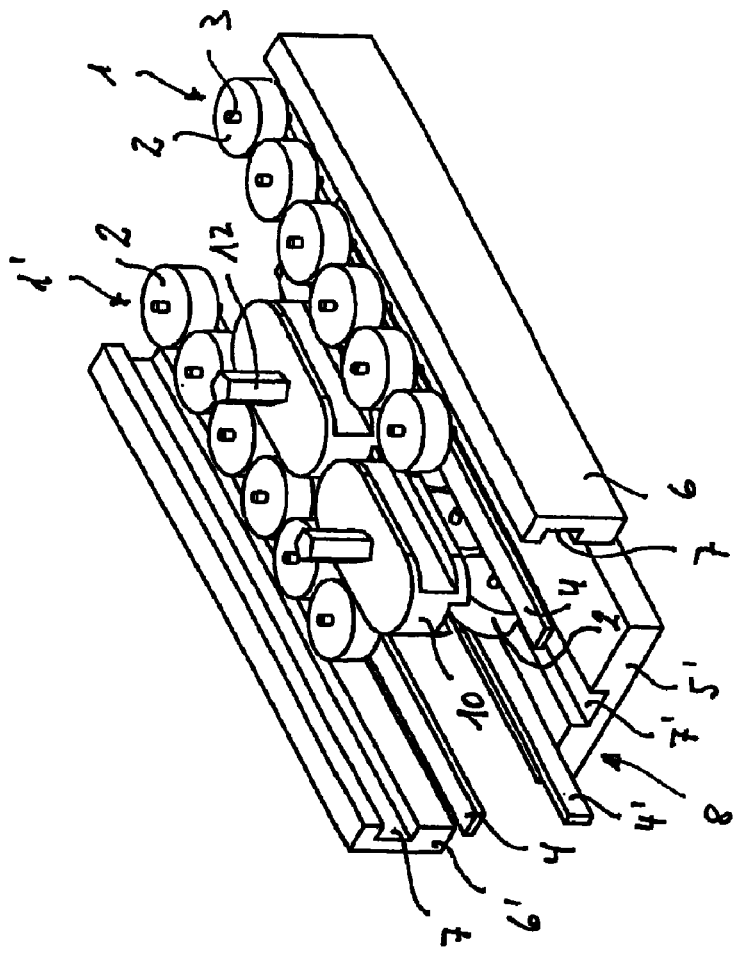
FIGS. 2A and 2B are a perspective view and a front view view of a part of an embodiment with three rolling bodies for guiding the conveying bodies.
Figure 2B:
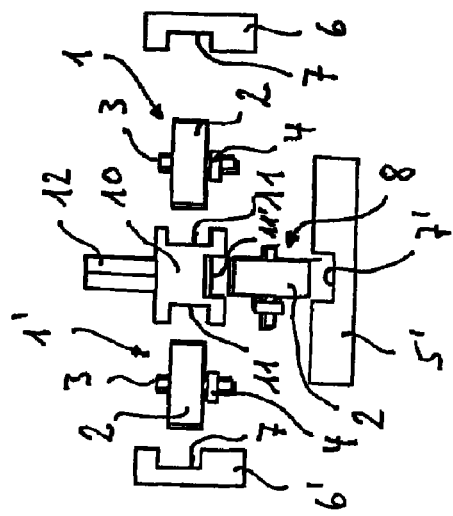

FIGS. 2A and 2B in an exploded drawing illustrate a part of a different embodiment of the rolling conveying device. In addition to the embodiment depicted in the FIGS. 1A and 1B, a third rolling body 8 (exceptionally not designated with 1, but advantageously of the same manufacture as the rolling body 1) is arranged underneath the conveying bodies 10, the position of which is easily seen in the frontal view in accordance to FIG. 2B. The conveying bodies 10 for guiding the rollers 2 of the conveying body 8 comprise an engagement groove or guide groove 11'. Equally, the modified connecting plate 5' comprises an engagement groove or guide groove 7', in analogy the guide rails. It is possible that the depth of the guide groove 11' in the conveying bodies 10 amounts to less than ⅕ of the diameter of the rollers utilised. It is also conceivable that one completely makes do without them (the guide grooves) on the conveying bodies and that the rollers 2 only serve to support a load. This embodiment, for example, is suitable for heavy loads, in the case of which the additional rolling body 8 is capable of taking over a significant part of the load. In addition, the designing of the rollers 2, resp., of the rolling body 8 as a combination of rollers is able to be implemented especially for greater loads. The same is applicable for the guide rails 6, 6', 5.

This embodiment, for example, is suitable for a contour-oriented conveyance, that is, over several levels, of articles such as packages in postal distribution centers or of travellers' baggage at airports. The flowing, non-jolting, not awkward and as continuous as possible conveyance by means of an inexpensive installation is always a requirement of the market, which is easy to fulfil with a device of this kind in accordance with the invention.

Figure 3C:
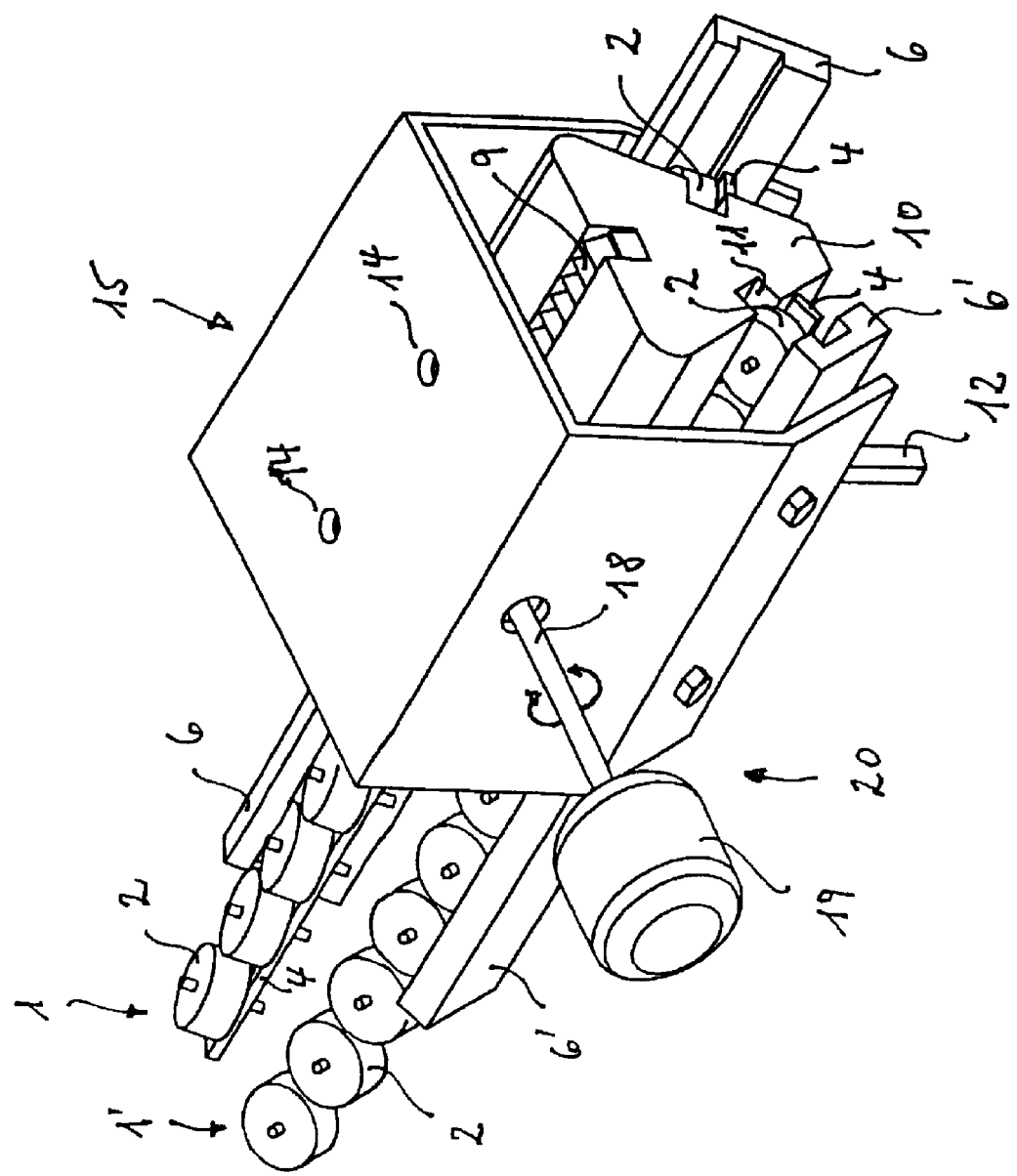

FIGS. 3A, 3B and 3C in an exploded view illustrate a part of a further embodiment. The conveying body 10 is designed in the shape of a kind of prism with essentially 60 degree angles. The two rolling bodies 1 and 1' are arranged orthogonally to the surface of the conveying body, so that they themselves are inclined towards one another (in essence they form a 120 degree angle). At the tip between the rollers 2, a receptacle 12 for the attachment of a means, for example, a clamp, a hook or something similar is arranged. In the oppositely situated flat side a conveying toothing 9 is shown and above it, stylised, a drive unit 20 with a drive motor 19, which through a shaft 18 is capable of driving a star-shaped drive wheel 16 here in both directions of rotation, refer to the double arrow. In the case of longer conveying stretches, drive units 20 of this kind are arranged distributed over the complete rolling conveying device. It is more advantageous to provide several drive units distributed over the conveying stretch than a single one. Thus, a distribution of gaps is to be expected instead of a single large gap immediately behind the single drive. In this context, it, of course, has to be observed that every drive unit has to provide the same conveying speed for the system, which with current means for controlling motors does not represent a problem.

This embodiment is suitable, for example, for arrangement at the ceiling of a room. FIG. 3C illustrates an attachment to a ceiling 15, which, for example, may also have the appearance of a U bent together at the legs and which on its upper side comprises fixing holes 14, through which it is able to be attached to the ceiling. In the region of the guide rails, one is able to see fixing screws, by means of which the ceiling attachment is connected with the guide rails. Attachments of this kind, as illustrated in the Figure, are also capable of being directly combined with a drive. It is also possible that an embodiment of this kind of suspension and drive is arranged distributed over the whole conveying stretch.

The FIGS. 3A, 3B, 3C, in a stylised form, each respectively illustrate a part of the rolling conveying device with only a single conveying body of many, and respectively in detail the rolling bodies 1,1' and the guide rails 6,6' and a drive 20 with a cover 15, is a suspension device and is capable of being arranged at a distance between one another along the whole conveying track.

The FIGS. 4A and 4B and 4C illustrate a further embodiment, in which as the combination of rollers instead of rollers balls 2' (in analogy to the rollers 2) are utilised. In the FIGS. 4A and 4B the conveying bodies 10 are drawn somewhat pulled apart, in order that it is possible to see the balls through the gap produced. In assembled form, the conveying bodies pushing one another do not have a significant gap; the gap between the guide rails 6 and 6' and the conveying bodies 10 amounts to approximately ⅓ of the diameter of the balls utilised. The guide grooves 7, 11 are, of course, adapted to the ball shape. Furthermore, (FIG. 4A) on the roller bodies 1, 1' one is able to identify the connecting bodies 4 for receiving the balls 2'.

The FIGS. 5A, 5B and 5C illustrate a stylised depiction of a possible drive 20 for the specific displacement of the conveying bodies 10, on which manipulators for the product not illustrated, for example, grippers for flat objects are able to be attached. A star-shaped drive wheel 16 guided within a fixing block 17, which engages at the bottom side of the conveying bodies 10 (as an example, refer to the conveyor toothing 9 in FIG. 3A and in FIG. 5C), is driven by a drive motor 19 through a drive shaft 18. It goes without saying, that other types of engagement between the drive and the driven parts are conceivable, such as, for example, toothings as are utilised for gearwheels. The drive is controlled as required. It is, if so required, possible that it drives in two directions of rotation, refer to the double arrow, so that the conveying bodies 10 in the Figure are capable of being displaced to the left or to the right. The conveyance of the whole plurality formed by the conveying bodies 10, in the closed in itself track, is considered to be the drive in the conveying device. Individual drive units 20 are capable of being attached at different points, at which, depending on the length of the conveying track, a further drive is required, this also in the context of the gap distribution already mentioned above.

Figure 6:
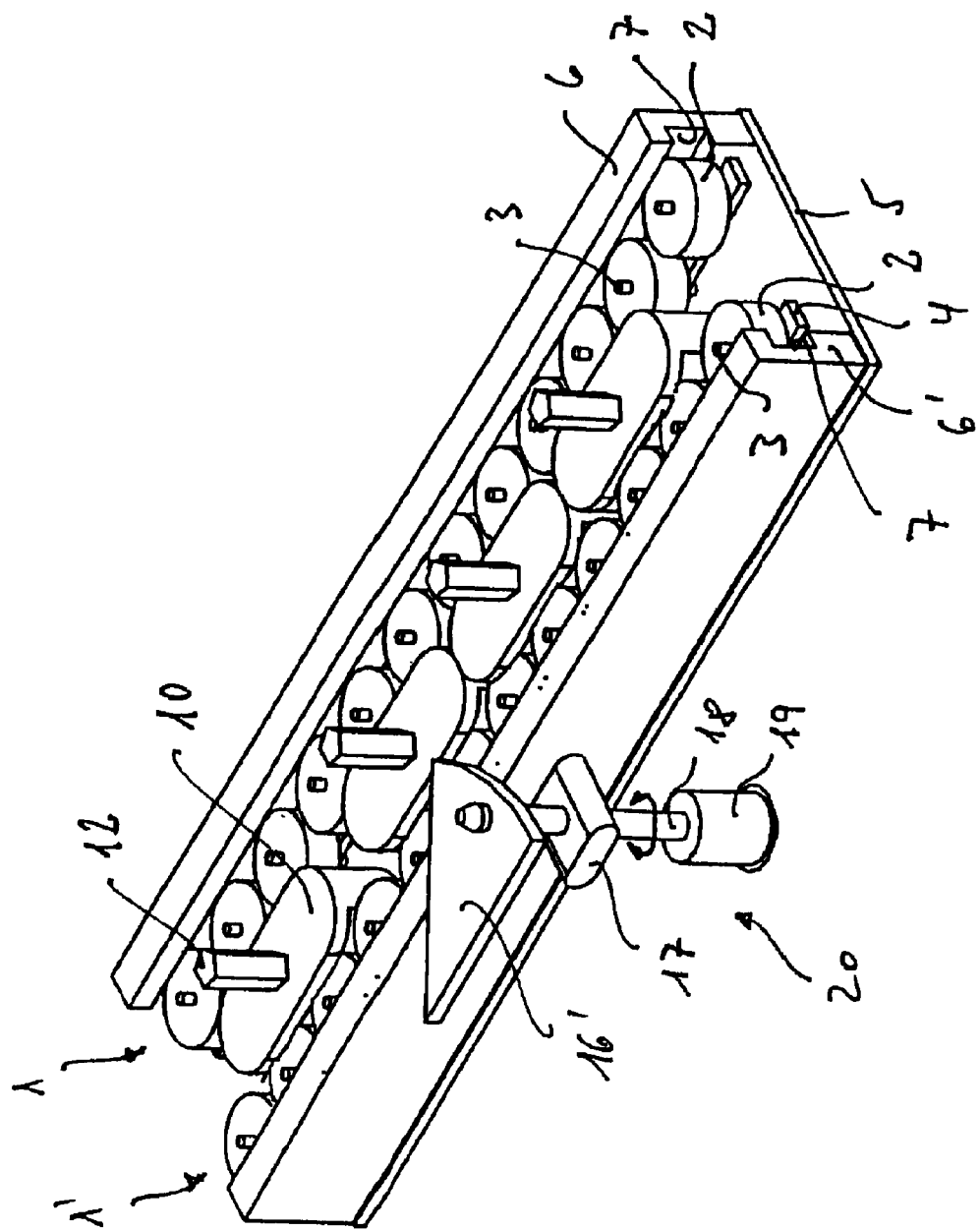
FIG. 6 is a perspective view of another embodiment of the invention with a stylised drive for the conveying bodies.

FIG. 6 illustrates a stylised depiction of a further possible drive 20 for the specific displacement of the conveying bodies, on which it is possible to attach manipulators for the product, for example, grippers. A sector-shaped drive wheel 16', in analogy to the star-shaped drive wheel 16, is driven through a drive shaft 18 by a drive motor 19, for example, a stepping motor. Shown here is a stylised holding device, here a fixing block 17 for the drive shaft 18. The drive angle of the drive wheel 16' is adjusted as required depending on the situation. It may amount to 360 angular degrees or also to only a part of this and this as per requirement in two directions (refer to the double arrow), so that the conveying bodies 10 in the Figure are able to be displaced to the left or to the right, also, however, only in parts, if, for example, an accurate positioning during standstill is necessary. This concerns the conveying, respectively, of all conveying bodies together simultaneously.

Figure 7C:
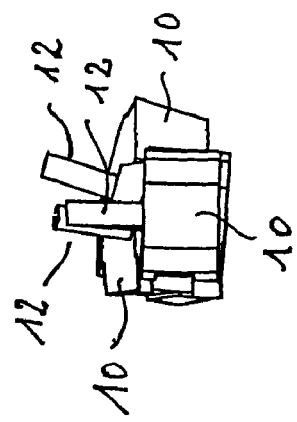
FIGS. 7A 7B and 7C are a perspective, side and front view of a row of conveying bodies in a three-dimensional curve.
Figure 7B:
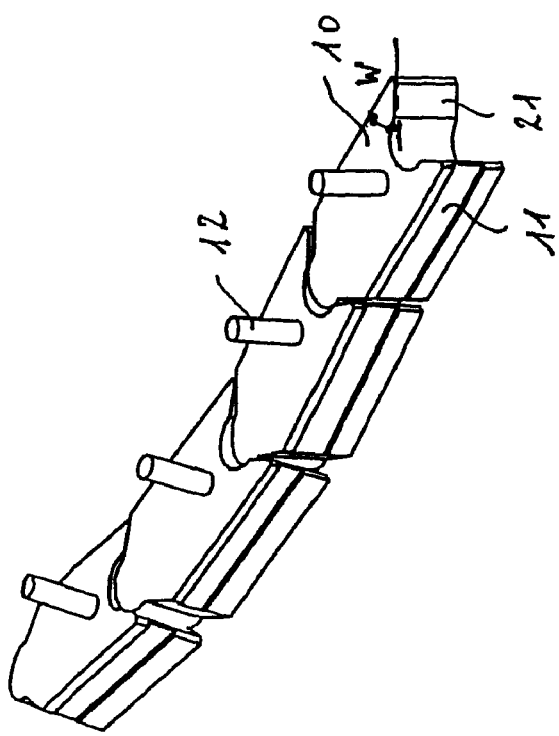
Figure 7A:
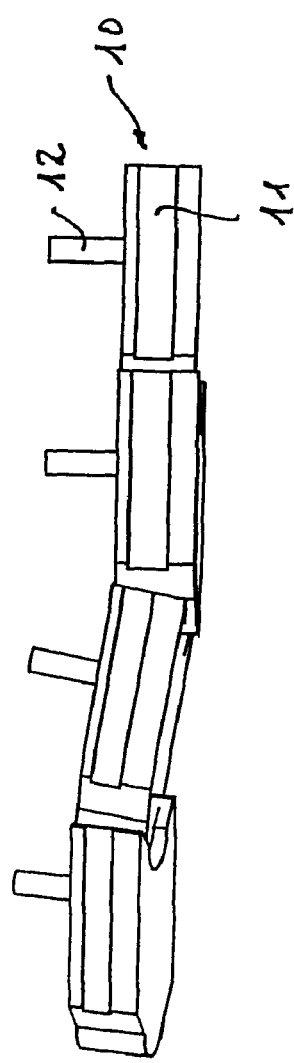

The FIGS. 7A, 7B and 7C one the one hand, as an example, depict a form of 4 conveying bodies 10 out of the plurality of all and on the other hand a placing together of these in such a manner, that, for example, they are capable of being conveyed in engagement with one another in a slight curve of a track bent in two directions 9 (sideways and upwards). The conveying bodies 10 comprise a stylised receptacle 12 for the attachment of a means, to which, for example, it is possible to attach manipulators. Also visible are the guide grooves 11 for the engagement of the rollers 2 of the roller bodies 1 and 1'. Because the conveying bodies 10, when they are not coupled together, are always pushed and not pulled, it is advantageous through the shaping of the contact points between two conveying bodies, by slanting faces 21 at a certain angle W to the external edge, to provide these with the characteristics of a movable extended conveying body. FIG. 7C illustrates the frontal view of the row, the tumbling motion of the conveying bodies on their track, which is bent in two directions, is well visible here.

Figure 8:
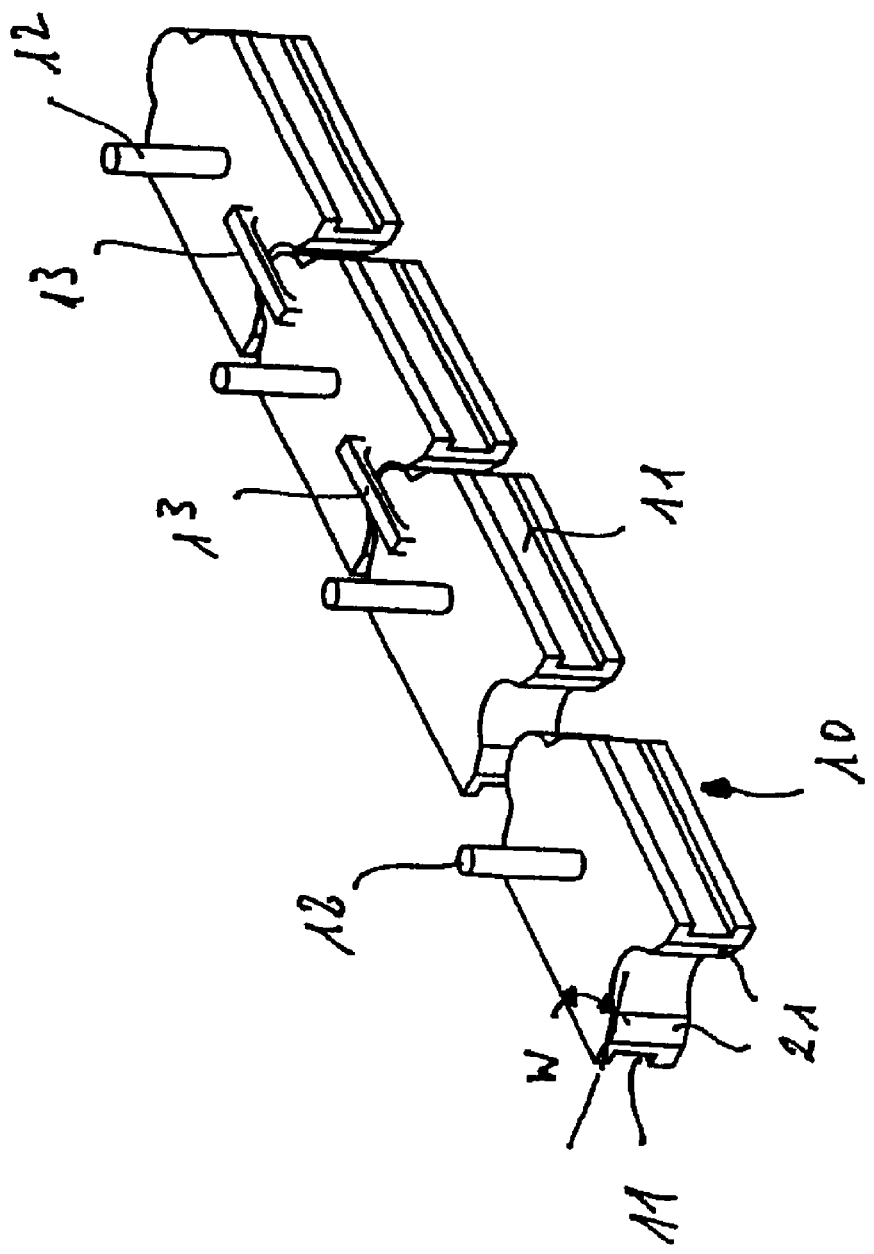
FIG. 8 is a perspective of conveying bodies with a special form of link joints between one another.

FIG. 8 illustrates another example of an embodiment, similar to the embodiment in the FIGS. 7A, 7B, 7C, however, for smaller radii in the conveying tracks. A fourth conveying body is depicted at a greater distance from the others, in order to make the shaping more visible in the zone, in which the conveying bodies are in contact with one another. The slanting faces 21 comprise a greater angle W to the longitudinal edge of the conveying body than in the case of the FIGS. 7A, B, C. As a further embodiment, three conveying bodies 10, as an example for all conveying bodies 10 of a device, are joined together through a connecting means 13, for example, an elastic connection. This makes the assembly easier and also the manipulation in case of a possible overhaul, one does not have to put individual components together to form a track, which have to be inserted between the roller bodies in a certain direction to one another. It is possible that the guide bodies are also supported on all sides, for example, as a ball shell or mutually, as illustrated in the Figure, in order to be capable of absorbing forces.

FIGS. 9A and 9B illustrate an example of a closed in itself track. As already pointed out above, the components guide rails 6, 6' and roller bodies 2, 2' and conveying bodies 10 lead back to themselves as a closed track and therefore form a closed track, which may be spatially arranged in any way required. In FIG. 9A this, for example, is a ring-shaped track, which cut open at one point comprises a gap L, in order to depict, as in the detailed FIG. 9B, the here also stylised components guide rails 6, 6', roller bodies with rollers 2 and conveying bodies 10 with the receptacle 12 of a means of attachment. These parts are visibly enlarged in the detailed drawing 9B.

FIGS. 10A and 10B illustrate an embodiment, in the case of which the rolling bodies 1, 1' (here only with one receptacle 22 or opening for the roller bodies) and the connecting pieces 4 form a unit and these are connected to one another through a connecting body 4, resp., by means of a connecting means 4'. This embodiment is particularly suitable for conveyance around curves with small radii. FIG. 10A depicts a curvature in a first curvature direction and FIG. 10B a (rotated by 90 degrees) second curvature direction. Evident from this is also a further curvature direction 180 degrees opposite to FIG. 10A and corresponding to FIG. 10B. Therefore with this embodiment it is possible not only to convey on tracks bent with curves, but also on spiral-shaped tracks.

The connecting piece 4 and rolling body 1, 1' form a unit; each individual part in these Figures comprises two receptacles 22 for receiving, resp., for respectively building-in a roller body, namely rollers 2, balls 2', cylinders 2", etc., wherein a plurality of roller bodies arranged in this manner each respectively form a first and a second rolling body 1, resp., 1'. A plurality of components of this kind are connected together by means of a connecting piece 4'; it is also possible that they are connected together in an articulated manner. The distance between the units, which may be selected in accordance with the application concerned, has a direct influence on the curve radius to be mastered. In FIG. 10B it is easily visible, that in the case of this 'bend' the distances are able to be short and in FIG. 10A one sees, that these distances are limited by the structural shape of the conveying body, This all the more so, when the rolling bodies 1, 1' connected through the connecting body 4 are brought to be bent rotated by 180 degrees to FIG. 10A.

FIGS. 11A and 11B illustrate the just discussed embodiment with roller bodies in the form of balls 2' and in addition with one 6 of the two guide rails 6, 6'. FIG. 11A depicts the curve from above, wherein in the operable condition the balls of course engage in the guide groove 7. From a different perspective in FIG. 11B one, however, because of the perspective distortion one does not see all the balls 2' of the roller bodies 1,1' anymore. But this depiction is suitable for demonstrating, how it is possible to put together a conveying device of this type.

FIGS. 11C and 11D illustrate an element or a part of the rolling body/the roller bodies 1, 1' with inserted balls 2' as roller bodies and with a conveying body 10 depicted in a simple manner arranged in between them.

FIG. 12A illustrates a rolling body 1, resp., 1' with roller bodies, here rollers 2 or cylinders 2", (also balls 2' are able to be utilised), in the case of which the roller axis has been replaced by two opposing pointed cones 24. These roller bodies are brought into a connecting body 4, which comprises receptacles 22 for all kinds of roller bodies, rollers, balls, cylinders, etc. This rolling body 1 preferably is designed to be elastic, not, however, flexible, so that it is capable of running around curve radii in a bendable manner, depicted with double arrows in different directions, but nonetheless is sufficiently rigid, in order that the inserted rollers 2 or cylinders 2" have a secure grip. A rolling body of this kind is capable of being manufactured in any length; it is also possible that it comprises standardised lengths and that it is arranged in sections between conveying bodies 10 and guide rails 6, 6'. In the following, an interesting application of a rolling body of this kind will be discussed.

The FIGS. 12B and 12C now illustrate from two perspectives a utilisation of the rolling body in accordance with FIG. 12A. One sees a guide body 26, which comprises two guide rails 6 and 6'. The guide rails 6,6' are curved and here implemented in one piece, in other words, the guide body 26 is designed in such a manner, that on one side the one and on the other side the other guide for the conveying bodies and rolling bodies are arranged or molded. The conveying bodies 10 in correspondence with this one-piece design comprise a guide groove 11 for rolling off the roller bodies 2" of the rolling body 1 on the one side of the guide rail, namely the part 6 and, stylistically depicted, on the other side, therefore opposite, rollers 2, which may also be fixed rollers (sliders), which run along the guide rail, namely the part 6'. This compact embodiment is particularly suitable, when for reasons of space, for example, in passages through walls or along walls or transitions between floor levels or in case of a spiral-shaped course of the track, a volume as small as possible is permitted. For greater loads one weighs down the conveying bodies 10 in such a manner, that they are seated on the rolling body 1 and for smaller loads it is possible to select the suspended operation, in which they move along the guide rail 6' together with the rolling body 1'.

Both Figures depict three conveying bodies 10 in different positions. A first conveying body is in engagement with the guide rail 6 on the one side and with the guide rail 6' on the other side. Between the guide groove 11 of the conveying body 10 and the guide groove 7 of the guide rail 6, the rolling body 1, of which a part only is depicted, is slid in; on the other side there is the rolling body 1', split-up over the rolling bodies, with rollers 2 in engagement with the guide rail 6'. The space for the rolling body 1 is easily visible in FIG. 12B. A second conveying body is not in engagement with the guide rail, the rolling body 1, however, is located close to the guide groove 11, which is easily visible in FIG. 12C. A third conveying body is depicted without engagement above the guide rail 6, so that it is easy to recognise its construction. This type of depiction was selected in order to on the one hand be in a position to illustrate clearly the engagement of the components into one another and on the other hand the components themselves. It goes without saying that in case of an installation the length of the track with the roller bodies and any number of conveying bodies is dimensioned in a manner to suit the requirements.

FIGS. 13A, 13B and 13C illustrate a further embodiment, in the case of which the rolling bodies 1, 1' consist of a plurality of roller bodies, which are not connected together, here balls 2' within a spacer cage 27 (with receptacles for roller bodies 22), which are arranged in such a manner, that they are close together and located between the conveying body 10 and the guide rail 6. This embodiment follows the embodiment of 4, but manifests a particularity, which plays a role in case of curves in the track. The roller bodies, here balls 2', are arranged to be rotatable in the spacer cage 27 and the ring-shaped receptacle 22 for roller bodies. The spacer cage 27 serves not only for receiving the balls 2', it also serves as a spacer between the guide rails and the conveying bodies, which FIG. 13A clearly depicts. FIG. 13B is the frontal view of FIG. 13A and illustrates the conveying body 10 with guide grooves 11, which through a special construction between the balls 2' and groove comprise a play in such a manner, that the conveying body 10 is capable of being displaced in the direction of the double arrow D transverse to the guide grooves 7, 7' of the guide rails 6, 6' (guide rail 6' not depicted), which is depicted in the form of a slight dislocation of the conveying body 10 out of its longitudinal axis. In case of a curve of the guide rails, here upwards or downwards, the rigid conveying bodies 10 extending over two balls 2' are capable of so to say tilting over the track radius, which is illustrated in FIG. 13C with a double arrow D. FIG. 13C in a perspective view illustrates the arrangement in principle, wherein on the opposite side of the guide rail 6 in addition a ball element 2' of the rolling body 1' of an equal plurality is depicted, to which then the second, not illustrated, guide rail 6' is able to adjoin.

In general, it is possible to summarise the invention as follows. A conveying device comprises at least one conveying body 10 as well as rolling bodies 1, 1' in operational interaction with it with a plurality, at least, however, with two rolling bodies such as rollers 2, balls 2', cylinders 2", etc., which rolling bodies 1, 1' are arranged on guide rails 6, 6', 5 and the at least one conveying body in such a manner, that the roller bodies 2, 2', 2" during the displacement of the at least one conveying body 10 are able to rotate freely. The rolling bodies 1, 1' form a combination of rollers, which, for example, is capable of comprising rollers 2 and/or balls 2' or cylinders 2", etc. It is possible that the device comprises one or several rolling bodies 1, 1'. Two rolling bodies 1, 1' are able to be located opposite one another at a straight angle relative to the conveying body 10. It is also possible that this angle is not straight. A third rolling body 8 may be arranged relative to two rolling bodies 1, 1' in such a manner, that it is capable of absorbing additional load force. The conveying bodies 10 as a rule are driven, not, however, the rolling bodies 1, 1', 8. The combination of rollers serves as a rolling support for the conveyed conveying bodies 10 and is arranged between these and the guide rails 6, 6', 5. To the conveying bodies 10 different types of means for the transportation of the conveyed goods are capable of being attached. It is also possible that they are connected together in a chain-like manner.

The three sub-assemblies guide rail, rolling body and conveying body are respectively designed in accordance with the application in question. If one considers the absolute mutual speeds together, then the following is applicable:

$V_{Guide\ rail} = 0$ and $V_{Rolling\ body} < V_{Conveying\ body}$ and they are connected together in a positive interlocking manner, but guided loosely to one another, which on the one hand has the effect of making the manufacturing costs lower and on the other hand reduces the wear.

LIST OF REFERENCE MARKS

1 First rolling body, 1' second rolling body
2 Rollers
3 Roller axes
4 Connecting bodies
4' Connection means for the rolling bodies
5 Connection plate/floor plate
5' Third engagement groove, resp., guide groove
6 First guide rail, 6' second guide rail
7 First engagement groove, resp., guide groove, 7' second engagement groove, resp., guide groove
8 Third rolling body
9 Conveying toothing
10 Driven conveying bodies
11 Engagement groove, resp., guide groove on the conveying body
12 Receptacle for the attachment of a means
13 Connection means for the conveying bodies
14 Attachment holes
15 Ceiling attachment
16 Drive wheel for the conveying bodies
17 Fixing block
18 Drive shaft
19 Drive motor
20 Drive unit
21 Slanted face on the conveying body
22 Receptacle for roller bodies
23 Attachment
24 Cone
25 Ball cage
26 Guide body
27 Spacer cage

The invention claimed is:

1. A conveying device comprising:
   at least one conveying body,
   rolling elements in operational connection with the conveying body (10),
   wherein the rolling elements are arranged between one of two guide rails and the at least one conveying body in such a manner that the rolling elements, during displacement of the at least one conveying body, are rotatable,
   at least one connecting body, wherein one connecting body per at least two rolling elements is present such that the connecting body supports the at least two rolling elements on opposite sides of a conveying body and determines a distance between the rolling elements, so that guide rails and conveying bodies are loosely guided with respect to one another,
   wherein the at least one connecting body is conveyable in the same direction as the conveying body and is generally U-shaped with an intermediate portion extending in a direction transverse to the direction of conveyance,
   wherein the rolling elements are either balls or cylinders, and
   wherein the conveying device is operable with curvatures in different directions of curvature such that the device can extend in any of three transverse directions.

2. The conveying device in accordance with claim 1, comprising a plurality of conveying bodies, which are arranged between rolling elements and also between guiding rails such that the rolling elements are freely rotatable when shifting at least one conveying body.

3. The conveying device according to claim 2, wherein the conveying bodies further include an attachment means for temporarily holding articles to be conveyed.

4. The conveying device in accordance with claim 2, wherein the conveying bodies are connected to one another with a connecting means for the conveying bodies.

5. The conveying device in accordance with the claim 2, wherein the conveying bodies are designed in such a manner that they are capable of being driven by means of a drive.

6. The conveying device in accordance with claim 1, wherein two rolling elements are arranged opposite one another on opposite sides of a conveying body along a straight line and are operatively connected with the conveying body or the conveying bodies and the guide rails.

7. The conveying device in accordance with claim 6, wherein at least one rolling element is a ball.

8. The conveying device in accordance with claim 1, comprising a plurality of connecting bodies and wherein the connecting bodies are connected to one another in an articulated manner.

9. The conveying device in accordance with claim 1, comprising a plurality of connecting bodies and wherein each connecting body comprises receptacles, each receptacle for receiving one cylinder or ball rolling element.

10. The conveying device in accordance with claim 1, wherein the operational connection between rolling elements and the at least one conveying body or the plurality of conveying bodies is achieved by guide grooves for the engagement of cylinders or balls.

11. The conveying device in accordance with claim 1, wherein two guide rails form a unit.

12. The conveying device in accordance with claim 1, wherein the connecting body moves in the same direction as the conveying body, but at a speed lower than the conveying body.

13. The conveying device in accordance with claim 1, wherein the rolling elements comprise axle elements and the cylinders are rotatably arranged around these axle elements.

14. The device in accordance with claim 1, wherein the device comprises the conveyance of flat products, preferably printed products.

15. A conveying device comprising:
   at least one conveying body,
   a rolling body in operational connection with the conveying body, wherein the rolling body comprises at least one connecting body, and the rolling body comprises a plurality of rollers,
   wherein the rolling body is arranged at least partially between guide rails and the at least one conveying body in such a manner that the rollers, during displacement of the at least one conveying body, are rotatable on interior surfaces of the guide rails,
   wherein the conveying device is operable with curvatures in different directions of curvature,
   wherein one connecting body is present such that the connecting body determines a distance between the rollers, and wherein the guide rails and conveying bodies are loosely guided with respect to one another, and
   wherein the at least one conveying body rolls on the rolling body, and comprises further rollers, which roll on an exterior surface a guide rail.

16. A conveying device comprising:
   at least one conveying body as well as,
   rolling bodies in operational connection with the conveying body,
   at least one connecting body,
   wherein the rolling bodies comprise a plurality of rollers and the rolling bodies are arranged between guide rails and the at least one conveying body in such a manner that the rollers, during displacement of the at least one conveying body, are rotatable,
   wherein the conveying device is operable with curvatures in different directions of curvature such that the device can extend in any of three transverse directions,
   wherein one connecting body per rolling body is present such that the connecting bodies determine a distance between the rollers, and that guide rails and conveying bodies are loosely guided with respect to one another, and
   wherein the a least one connecting body is conveyable in the same direction as the conveying body, but at a speed lower than that of the conveying body.

17. The conveying device in accordance with claim 16, wherein two rolling bodies are arranged opposite one another, not at a straight angle relative to one conveying body or to several conveying bodies, and are in an operational connection with the conveying body or the conveying bodies and with the guide rails.

18. The conveying device in accordance with claim 16, wherein three rolling bodies are arranged relative to at least one conveying body in such a manner that mutually supporting one another they act to oppose the forces which the at least one conveying body exerts on the rolling bodies and for their part support themselves on the guide rails.

19. The conveying device according to claim 16, wherein the connecting bodies comprise receptacles and that the rolling bodies are supported in these receptacles and are rotatable around an axis, wherein the axis is defined by pointed cones formed on the rollers.

20. The conveying device in accordance with claim 19, wherein the respective axes are arranged on one side of a ribbon-shaped connecting body and that on these axes, the rollers are freely rotatable.

21. The conveying device in accordance with claim 19, wherein the connecting bodies of the rolling bodies consist of an elastic material.

22. The conveying device in accordance with claim 21, wherein the rolling bodies are connected together as a unit transverse to the direction of conveyance with an elastic means of connection.

23. The conveying device in accordance with claim 16, wherein the operational connection between rolling bodies and the at least one conveying body or a plurality of conveying bodies is effected by guide grooves for the engagement of rollers or balls of the rolling bodies.

24. The conveying device in accordance with claim 16, wherein the conveying device is a device closed in itself, in which all conveying bodies are in engagement with one another and the rolling bodies as well as the guide rails lead back into themselves.

* * * * *